United States Patent Office 3,801,627
Patented Apr. 2, 1974

3,801,627
α-ACYLOXYACETIC ACID PRODUCTION

Victor P. Kurkov, San Rafael, Seymour J. Lapporte, Orinda, and William G. Toland, San Rafael, Calif., assignors to Chevron Research Company, San Francisco, Calif.
No Drawing. Continuation-in-part of application Ser. No. 282,516, Aug. 21, 1972, now Patent No. 3,751,453. This application May 24, 1973, Ser. No. 363,777
Int. Cl. C07c *67/00*
U.S. Cl. 260—494
8 Claims

ABSTRACT OF THE DISCLOSURE

α-Acyloxyacetic acids are produced by the reaction of formaldehyde, a carboxylic acid and carbon monoxide in the presence of catalytic amounts of hydrogen iodide or bromide.

RELATED APPLICATION

This application is a continuatin-in-part of U.S. Ser. No. 282,516, filed Aug. 21, 1972, now U.S. Pat. No. 3,751,453.

DESCRIPTION OF THE PRIOR ART

The preparation of α-acetoxypropionic acid from acetaldehyde, carbon monoxide and acetic acid in the presence of acidic catalysts, e.g., hydrochloric acid and sulfuric acid, is disclosed in U.S. Pat. No. 2,265,945, issued on Dec. 9, 1941, to D. J. Loder.

U.S. Ser. No. 282,516, filed Aug. 21, 1972, now U.S. Pat. 3,751,453, discloses the preparation of α-acyloxyacetic acids by the reaction of formaldehyde, a carboxylic acid and carbon monoxide in the presence of a catalyst amount of a rhodium compound and an iodide promoter.

The preparation of α-hydroxyacetic acid (glycolic acid) from formaldehyde, carbon monoxide and water in the presence of acidic catalysts at high pressures and temperatures is disclosed in Noller, "Chemistry of Organic Compounds," page 743, 2nd ed., 1957, W. B. Saunders Co., Philadelphia, Pa.

SUMMARY OF THE INVENTION

It has now been found that α-acyloxyacetic acids are produced in good yields by the reaction of formaldehyde, a carboxylic acid and carbon monoxide in the presence of catalytic amounts of hydrogen iodide or hydrogen bromide.

DESCRIPTION OF THE INVENTION

The hydrogen iodide or bromide catalyst is suitably provided in the form of the gaseous material or as concentrated aqueous hydroiodic or hydrobromic acid solutions. The hydrogen iodide or bromide catalyst is preferably employed in the form of the gaseous material.

The concentration of the hydrogen iodide or bromide in the reaction medium may vary widely over the broad concentration range of $10^{-6}$ mols/liter to 18 mols/liter. In the process of this invention, however, the preferred concentration range of promoter is $10^{-4}$ mols/liter to 2 mols/liter.

The formaldehyde reactant is suitably introduced in the pure form or produced in situ, e.g., from paraformaldehyde or trioxane. In the preferred modification of the process, the formaldehyde is provided in the form of trioxane.

The process of the invention is applicable to aliphatic and aromatic carboxylic acids of from 1 to 10 carbon atoms.

Preferred carboxylic acid reactants comprise alkanoic acids of 1 to 10 carbon atoms, dialkanoic acids of 3 to 10 carbon atoms, haloalkanoic acids of 1 to 10 carbon atoms and of 1 to 5 halogens of atomic numbers from 9 to 35 (fluorine, chlorine and bromine) and hydrocarbon aromatic acids of 7 to 10 carbons and 1 to 2 carboxy groups. The most preferred carboxylic acid reactants are alkanoic acids of 2 to 6 carbon atoms, especially acetic and propionic acids.

Representative alkanoic acids include formic, propionic, butyric, isobutyric, valeric, hexanoic, heptanoic, octanoic, decanoic, etc. Representative dialkanoic acids include malonic acid, succinic acid, adipic, etc. Representative haloalkanoic acids include trifluoroacetic, trichloroacetic, tribromoacetic β,β,β-trichloropropionic acid, perchloropropionic acid, β-chloropropionic acid, β-bromopropionic acid, etc. Representative aromatic acids include benzoic, p-toluic acid, 2,4-dimethylbenzoic acid, o-phthalic acid, isophthalic acid, terephthalic acid, etc.

The carbon monoxide is employed in the process at partial pressures of about 1 p.s.i.a. to about 5000 p.s.i.a., although partial pressures of about 200 p.s.i.a. to 2000 p.s.i.a. are preferred. Carbon monoxide streams containing inert impurities such as carbon dioxide, hydrogen, methane, nitrogen and paraffinic hydrocarbons having 1 to 4 carbon atoms may be employed, if desired.

The net reaction of the process of the invention is depicted in Equation 1.

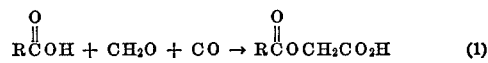

$$R\overset{O}{\underset{\|}{C}}OH + CH_2O + CO \rightarrow R\overset{O}{\underset{\|}{C}}OCH_2CO_2H \qquad (1)$$

wherein

$$R\overset{O}{\underset{\|}{C}}OH$$

represents the carboxylic acid reactant.

When the carboxylic acid reactant is a dicarboxylic acid, the carboxylic acid reactant may react with additionl formaldehyde and carbon monoxide to form a mixture of products, as depicted in Equation 2.

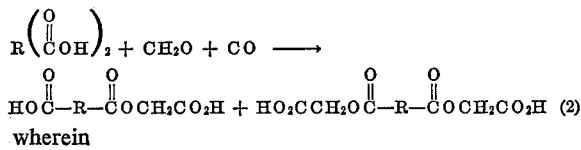

$$R\left(\overset{O}{\underset{\|}{C}}OH\right)_2 + CH_2O + CO \longrightarrow$$
$$HO\overset{O}{\underset{\|}{C}}-R-\overset{O}{\underset{\|}{C}}OCH_2CO_2H + HO_2CCH_2O\overset{O}{\underset{\|}{C}}-R-\overset{O}{\underset{\|}{C}}OCH_2CO_2H \qquad (2)$$

wherein

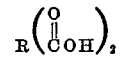

$$R\left(\overset{O}{\underset{\|}{C}}OH\right)_2$$

represents the dicarboxylic acid reactant.

Illustrative α-acyloxyacetic acid product includes α-formyloxyacetic acid, α-acetoxyacetic acid, α-(trichloroacetoxy)-acetic acid, bis-(carboxymethyl) adipic acid ester, monocarboxy methyl adipic acid ester, α-propionyloxyacetic acid, α-butyryloxyacetic acid, α-valeroyloxy acetic acid, α-hexanoyloxyacetic acid, α-decanoyloxyacetic acid, α-benzoyloxyacetic acid, α-(p-toluoyloxy)-acetic acid, bis-(carboxymethyl) phthalic acid ester, monocarboxymethyl phthalic acid ester, etc. The preferred α-acyloxyacetic acid products are α-alkanoylacetic acids, especially α-acetoxyacetic acid.

The α-acyloxyacetic products may be hydrolyzed, e.g., with aqueous sodium hydroxide solution, to glycolic acid, a chemical of commerce.

THE REACTION CONDITIONS

The reactants employed in the process of the invention are generally contacted in the molar ratios defined by the stoichiometry of Equation 1. That is, the molar ratio of carboxylic acid to formaldehyde is substantially equimolar (e.g., 1.5:1 to 1:1.5) and the molar ratio of carbon monoxide to formaldehyde is substantially equimolar (e.g., 1.5:1 to 1:1.5). For carboxplic acids having two carboxy groups, an additional molar amount of formaldehyde and carbon monoxide may be employed, e.g., molar ratios of carboxylic acid to formaldehyde or carbon monoxide are about 1.5:2 to 1:2.5. However, an excess of any reactant is suitably employed. For example, in some modifications of the process, it is desirable to employ excess carboxylic acid and/or carbon monoxide as reaction diluents. Accordingly, molar ratios of carboxylic acid to formaldehyde of from 10:1 to 1:2.5 are satisfactory, although molar ratios of from 5:1 to 1:1 are preferred; and molar ratios of carbon monoxide to formaldehyde of from 10:1 to 1:2.5 are satisfactory, although molar ratios of from 5:1 to 1:1 are preferred.

The process of the invention is conducted in a fluid phase, either in the gaseous or liquid phase, in the presence or in the absence of an inert reaction diluent. Suitable inert, normally liquid diluents are hydrocarbons free from aliphatic unsaturation such as hexane, heptane, octane, decane, cyclohexane, benzene, toluene and xylene. Suitable normally gaseous diluents are nitrogen, hydrogen, argon, helium, methane and ethane. As indicated above, in some modifications of the process, a portion of the carbon monoxide or carboxylic acid reactant suitably serves as the reaction diluent. When diluent is employed, up to about 50 mols per mol of formaldehyde reactant are satisfactory. The process is suitably conducted in an inert, substantially anhydrous, reaction environment so that the presence of reactive materials such as oxygen and water are desirably avoided.

The process of the invention is carried out by intimately contacting the formaldehyde, carboxylic acid and carbon monoxide in the presence of the hydrogen iodide or bromide catalyst. A variety of procedures can be employed for contacting the reaction components with the catalyst. In one modification, the entire amounts of formaldehyde, carboxylic acid, carbon monoxide and catalyst are charged to an autoclave or similar pressure reactor and maintained at reaction conditions for the desired reaction period.

The process of the invention is conducted at moderate temperatures and pressures. Suitable reaction temperatures varying from about 100° C. to 300° C. are satisfactory, and reaction temperatures varying from about 150° C. to 250° C. are preferred. The process is conducted at or above atmospheric pressure, and pressures from about 1 atmosphere to about 200 atmospheres are satisfactory.

At the conclusion of the reaction, the product mixture is separated and the α-acyloxyacetic acid product is recovered by conventional means such as fractional distillation. Unreacted reaction components are suitably recycled for further use in the process.

EXAMPLES

Examples 1–5

The preparation of α-acetoxyacetic acid from formaldehyde, carbon monoxide and acetic acid in the presence of hydrogen iodide and hydrogen bromide was carried out by the following procedure. For comparison, the same reaction also was conducted in the presence of hydrogen chloride and sulfuric acid.

An autoclave was sealed and flushed with nitrogen followed by carbon monoxide. The acetic acid, the acid catalyst and formaldehyde were then added to the autoclave. The autoclave was sealed and pressured with carbon monoxide and rapidly heated to reaction temperature.

Each experiment was conducted with 0.167 mol of trioxane, 2 mols acetic acid and 0.055 mol of acid catalyst. The reaction temperature was 150° C., the reaction time was 5 hours, and the carbon monoxide pressure was maintained throughout the reaction period at 1000 p.s.i.g. The reaction product mixture was analyzed by gas-liquid chromatography.

The acid catalyst employed and the yield of products (based on trioxane charged) are tabulated in Table I.

TABLE I

| | Run number | | | | |
|---|---|---|---|---|---|
| | 1 | 2 | 3 | 4 | 5 |
| Acid catalyst | HI | HI | HBr | HCl | $H_2SO_4$ |
| Percent yield α-acetoxyacetic acid | 45 | 52 | 53 | 12 | 23 |
| Percent yield methylene bis-acetate | 3 | 0 | 0 | 9 | 5 |

What is claimed is:
1. A process for producing α-acyloxyacetic acid which comprises reacting formaldehyde, carbon monoxide and a carboxylic acid selected from alkanoic acids of 1 to 10 carbon atoms, dialkanoic acids of 3 to 10 carbon atoms, haloalkanoic acids of 1 to 10 carbon atoms and 1 to 5 halogens of atomic number 9 to 35 and hydrocarbon aromatic acids of 1 to 2 carboxy groups in the presence of catalytic amounts of hydrogen iodide or bromide, the molar ratio of carboxylic acid to formaldehyde being from about 10:1 to 1:2.5, at a temperature from about 100° C. to 300° C. and a carbon monoxide partial pressure of from about 1 p.s.i.a. to 5000 p.s.i.a.

2. The process of claim 1 wherein the carboxylic acid is an alkanoic acid.

3. The process of claim 2 wherein the alkanoic acid has from 2 to 6 carbon atoms.

4. The process of claim 3 wherein the molar ratio of carbon monoxide to formaldehyde is from 5:1 to 1:1 and the molar ratio of alkanoic acid to formaldehyde is 5:1 to 1:1.

5. The process of claim 4 wherein the reaction temperature is 100 to 250° C. and the carbon monoxide partial pressure is from 200 to 2000 p.s.i.a.

6. The process of claim 5 wherein the alkanoic acid is acetic acid or propionic acid.

7. The process of claim 6 wherein the catalyst is hydrogen iodide.

8. The process of claim 6 wherein the catalyst is hydrogen bromide.

References Cited

UNITED STATES PATENTS

| 3,751,453 | 881973 | Kurkov et al. | 260—494 |
| 2,211,624 | 8/1940 | Loder et al. | 260—494 |

VIVIAN GARNER, Primary Examiner

U.S. Cl. X.R.

260—408, 410.9 R, 475 R, 476 R, 485, 487